No. 883,748. PATENTED APR. 7, 1908.
C. W. ROBINSON.
MOWING MACHINE.
APPLICATION FILED JUNE 7, 1907.

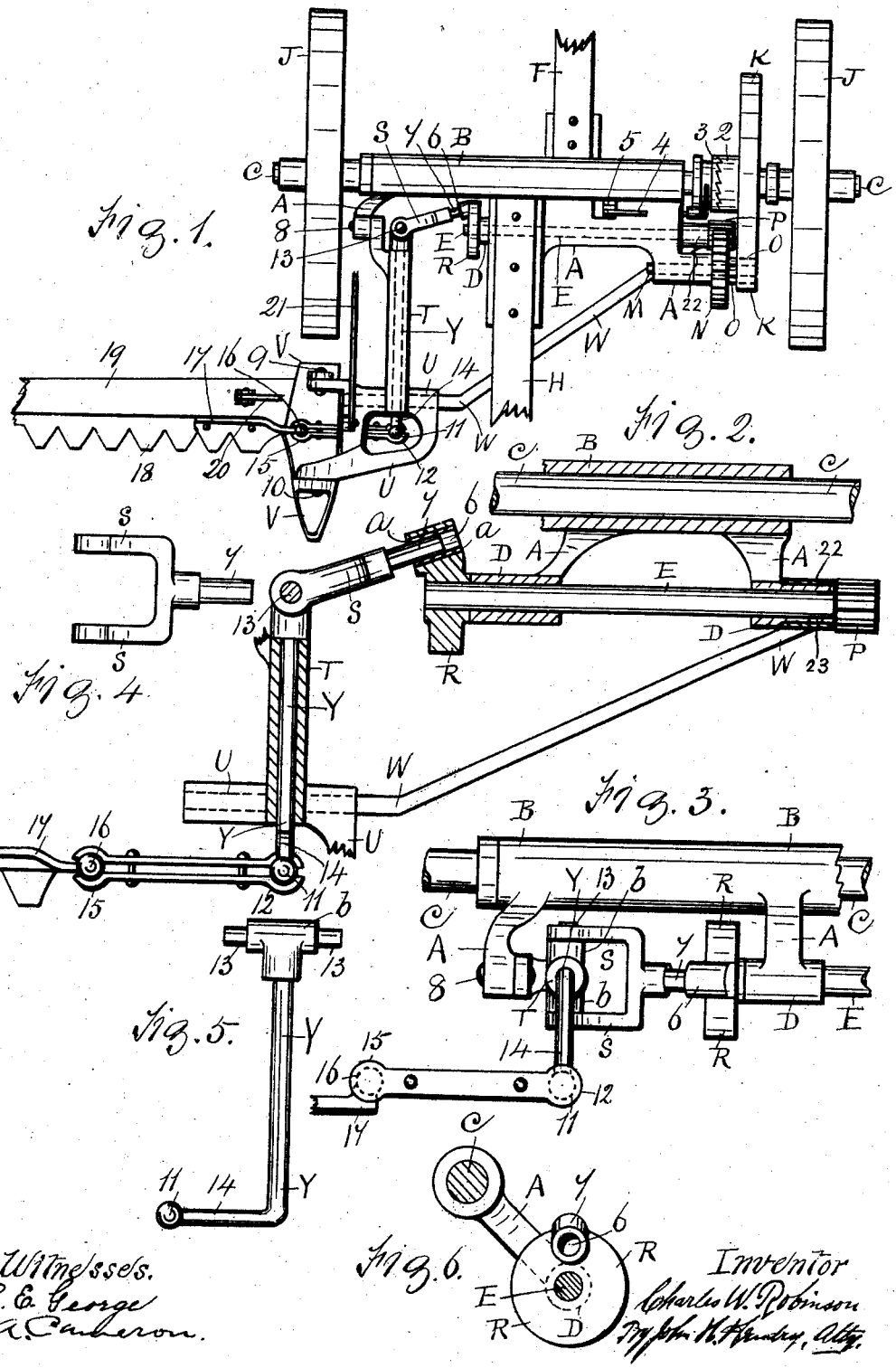

2 SHEETS—SHEET 2.

Witnesses.
L. E. George
A. Cameron

Inventor.
Charles W. Robinson
By John E. Hendry, Atty.

UNITED STATES PATENT OFFICE.

CHARLES W. ROBINSON, OF HAMILTON, ONTARIO, CANADA.

MOWING-MACHINE.

No. 883,748.   Specification of Letters Patent.   Patented April 7, 1908.

Application filed June 7, 1907. Serial No. 377,691.

*To all whom it may concern:*

Be it known that I, CHARLES W. ROBINSON, citizen of the United States, residing at Hamilton, in the county of Wentworth and Province of Ontario, Canada, have invented certain new and useful Improvements in Mowing-Machines, of which the following is a specification.

My invention relates to improvements in mowing machines in which a horizontal shaft, having ground wheels, is suitably mounted on the frame of the machine and adapted to drive a horizontal crank disk shaft, by means of gearing, said crank adapted to rock or oscillate a pitman shaft by means of a link coupling loosely connected to said disk crank and to the pitman shaft.

Figure 7:
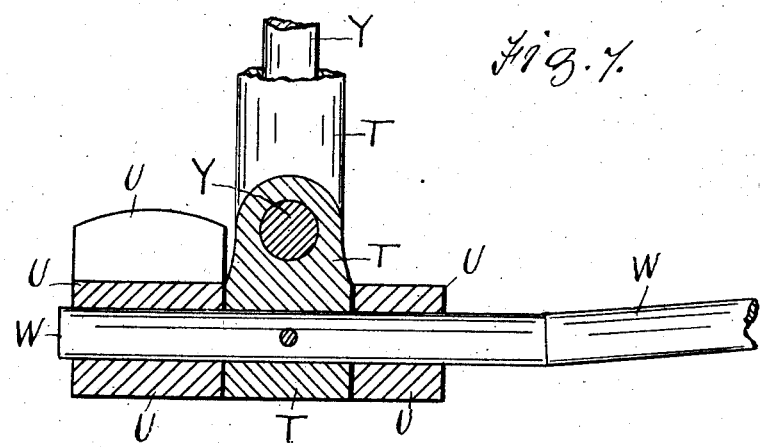
Figure 8:
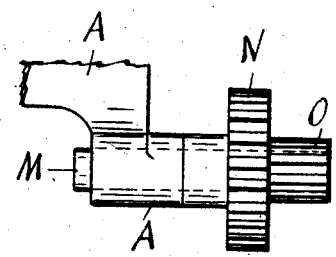

The objects of my invention are first, to provide a mowing machine having means to reciprocate the horizontally moving knives at a high rate of speed, second, to provide means that will reciprocate the knives when the same are bodily raised or lowered, or the outer end part of the knives are considerably raised or lowered to suit uneven ground, third to provide a long and suitable bearing for the pitman shaft thereby producing a steady and even oscillatory, or rocking motion to the shaft, and fourth, to provide mechanism whereby the pitman connected to the rock shaft may be considerably shortened from the average pitmen of mowers, and at the same time accomplish its function when the outer end part of the knives are adjusted to a high or a low position to suit uneven ground. I attain these objects by the mechanism illustrated in the accompanying drawing in which:

Figure 1 is a plan of a mowing machine embodying my invention, the outer end part of the knives, together with the tongue and the seat parts being broken away. Fig. 2 is an enlarged plan of a part of the same, the bearings of the horizontal main shaft, the crank shaft and the crank disk being in section, together with the bearing of the pitman rock shaft. Fig. 3 is an enlarged front elevation of parts of the main shaft bearing, the crank disk and its shaft, and the link loosely connecting said crank, and the pitman rock shaft and pitman. Fig. 4 is an enlarged detail elevation of the link. Fig. 5 is an enlarged detail end elevation of the pitman rock shaft. Fig. 6 is an enlarged detail end elevation of the crank disk, on its shaft, showing the inclined socket on the crank, for the journal of the link, also showing said crank shaft bearing connected to the main drive shaft bearing by the frame of the machine. Fig. 7, is an enlarged front sectional elevation of the pitman shaft in its sleeve, said sleeve extending downwardly and secured to the drag bar, together with the shoe connection, or yoke, adapted to oscillate on said drag bar. Fig. 8, is an enlarged detail plan of the frame and spur wheels which rotate the crank disk.

Similar letters refer to similar parts throughout the several views.

In the drawing the frame of the machine is indicated by A and is not confined to any particular shape, and B is a horizontal bearing for the main drive shaft C, and forms a part of the frame.

D are bearings for the crank disk shaft E, and also form a part of the frame A.

F is the lower part of the seat spring of the machine, and H is the tongue part of the machine, J are the ground drive wheels adapted to rotate loosely on the shaft C at any rearward movement of the machine and to rotate the shaft at a forward movement by means of pawls in the hubs thereof, in the usual manner of machines of this class.

K is an internal gear wheel adapted to rotate loosely on the shaft C, and has a common clutch hub 2, adapted to receive the clutch 3, adapted to slide on the shaft C, to be brought into, and out of mesh with the teeth part of the clutch 2 by means of a lever 4, which is fulcrumed at 5, to the frame, in order to rotate the gear wheel K.

A short forward counter shaft M is fixed in the frame A, and has a spur wheel N loosely connected thereto, and a small gear wheel O, forms a part of the wheel N, and meshes into the lower part of the internal gear wheel K, that the wheels N and O, may be rotated together by the wheel K. A small pinion wheel P, is secured on the right hand end part of the shaft E, and meshes into the wheel N, to rotate the crank disk R secured on the opposite end of the shaft E. The crank R, has an inclined crank bearing or socket 6, having a bushing "*a*" adapted to receive the journal 7, of the link S, said journal to follow the movement of the incline bearing of the crank, thereby oscillating the opposite and pivotal end part of the link, hereinafter mentioned. A long sleeve bearing T, is pivotally connected at 8, to the frame A, and the opposite end of the sleeve is connected to the drag-bar W. The shoe connection U is pivoted on the drag bar W. The shoe V is pivotally connected at 9 and 10 to said shoe connection U. The drag bar W is connected at its rear end to the extension 23 of the frame A, and is thereby adapted to swivel on the said extension of the frame and concentric to said shaft E. The rock shaft Y is supported in the pivotal sleeve T, and is adapted to rock therein, and the forward end part of the rock shaft is bent downwardly in crank form and terminating with a ball shaped end 11, for the coupling thereto of the pitman 12. The rear end of the rock shaft Y has the form of a T head "$b$". The gudgeon 13 extends through the head "$b$" and rigidly connected thereto, the outer ends 13 form pivotal connection with arms S of the link, and the head "$b$" rocks with the shaft Y by the rotation of the crank disk together with its shaft E. The crank disk shaft E, the gudgeons 13 and the shaft Y intersect with each other. The link device S together with the crank R, oscillate at a high rate of speed, consequently the pitman 12 connected to the lower crank end 14 of the shaft Y, by ball and socket mechanism is capable of a high speed oscillating motion. The opposite end 15 of the pitman has a similar socket to its crank connecting end, and connects with a ball 16, of the strip 17, of the propelling end of the reciprocating grass cutting knives 18.

The finger bar 19 of said knives 18, forms a part of the shoe V and the outer end is adapted to be raised and lowered together with the knives 8, on the pivotal centers 9 and 10 of the shoe connection U and the shoe V. The cutting apparatus 18, and 19, together with the shoe V, the shoe connection U, the sleeve T, and the drag bar W, can be raised on the pivotal centers 8, and 23, of the frame. The rod or lever 20, having pivotal connection with the knife bar 19, is shown broken and is for the purpose of connecting to hand or foot mechanism of the machine for said raising and lowering of the bar 19. The rod 21, has pivotal connection to the upper part of the shoe connection U and is shown broken and is for the purpose of connecting to lever mechanism, (not shown) to tilt the knives, the shoe connection U, together with the shoe V, and the bar 19.

It will be noticed in Fig. 1 of the drawing, that the outer end of the bar 19 is adapted to be considerably raised and lowered on the pivotal centers 9 and 10 of the shoe; also that the forward end part of the sleeve T is adapted to be raised and lowered on its pivotal connection 8, and the swivel connection of the drag-bar W on the frame A, as previously mentioned. The cutting apparatus is tilted at about the axis of the drag bar W, which is substantially parallel with the main shaft.

The important part of this invention is the manner of providing free and smooth reciprocating motion to the knives 18, from the motive rotary power of the ground wheels J; and at the same time to provide a knife bar together with the ground shoe adapted to be raised and lowered while the machine is in operation, also to eliminate bevel gears ordinarily used in mowing machines.

What I claim as my invention and desire to secure by Letters Patent, is:—

1. In a mowing machine, a frame, a main shaft mounted thereon, ground wheels on the shaft, a crank shaft mounted on the frame, a crank disk on the shaft, an inclined crank socket on the disk, a sleeve bearing pivotally connected to the frame, a shaft in the sleeve, a link loosely connected to the rear end part of the shaft and the opposite end of the link adapted to rotate in said socket at the rotation of the crank shaft and oscillate the shaft.

2. In a mower, a frame, a crank shaft mounted thereon, a pinion wheel on one end of the shaft, a disk on the opposite end thereof, an inclined crank bushing on the disk, a sleeve pivotally connected to the frame, a shaft in the sleeve, a T head on the shaft, a link loosely connected to the T head, a journal on the opposite end of the link adapted to fit loosely in said bushing and oscillate the shaft, on the rotation of the crank shaft.

3. In a mower, a frame, a crank shaft mounted thereon, a pinion wheel on the shaft, a crank disk on the opposite end thereof, an inclined crank bushing on the disk, a sleeve pivotally connected to the frame, a pitman crank shaft in the sleeve, a link loosely connected to the rear end of the pitman shaft and the opposite end of the link adapted to rotate in said bushing to oscillate the pitman shaft by the rotation of the disk shaft, a pitman on the crank end of the pitman shaft and horizontally reciprocating knives connected to the outer end of the pitman.

4. In a mower, a frame, a shaft mounted thereon, a pinion on the shaft, a crank disk having an inclined crank bushing on the shaft, a sleeve pivotally connected to the frame, a shaft in the sleeve, a crank on the forward end of the shaft, a link loosely connected to the rear end of the shaft, a journal on the opposite end of the link adapted to rotate in said bushing, thereby oscillating the shaft together with its connecting crank.

5. In a mower, a frame, a shaft mounted thereon, a pinion on the shaft, a disk having an inclined crank socket on the opposite end of the shaft, a sleeve pivotally connected to the frame, a pitman crank shaft in the sleeve, means on the rear end of the pitman shaft to rotate with the crank disk to oscillate the pitman shaft, a shoe connection on the end of the sleeve, a drag-bar secured to the shoe connection, the opposite end of the drag bar having pivotal connection with the frame, a shoe pivotally connected to the shoe connection, and a pitman loosely connected to the crank end of the pitman shaft.

In testimony whereof I affix my signature in presence of two witnesses.

CHARLES W. ROBINSON.

Witnesses:
   JOHN H. HENDRY,
   RICHARD BUTLER.